Jan. 6, 1959 J. A. ARMSTRONG 2,867,287
DISCHARGE ELECTRODE
Filed June 4, 1956 3 Sheets-Sheet 1

INVENTOR
JOHN A. ARMSTRONG

BY Harold T. Stowell

ATTORNEY

Jan. 6, 1959
J. A. ARMSTRONG
2,867,287
DISCHARGE ELECTRODE
Filed June 4, 1956
3 Sheets-Sheet 2
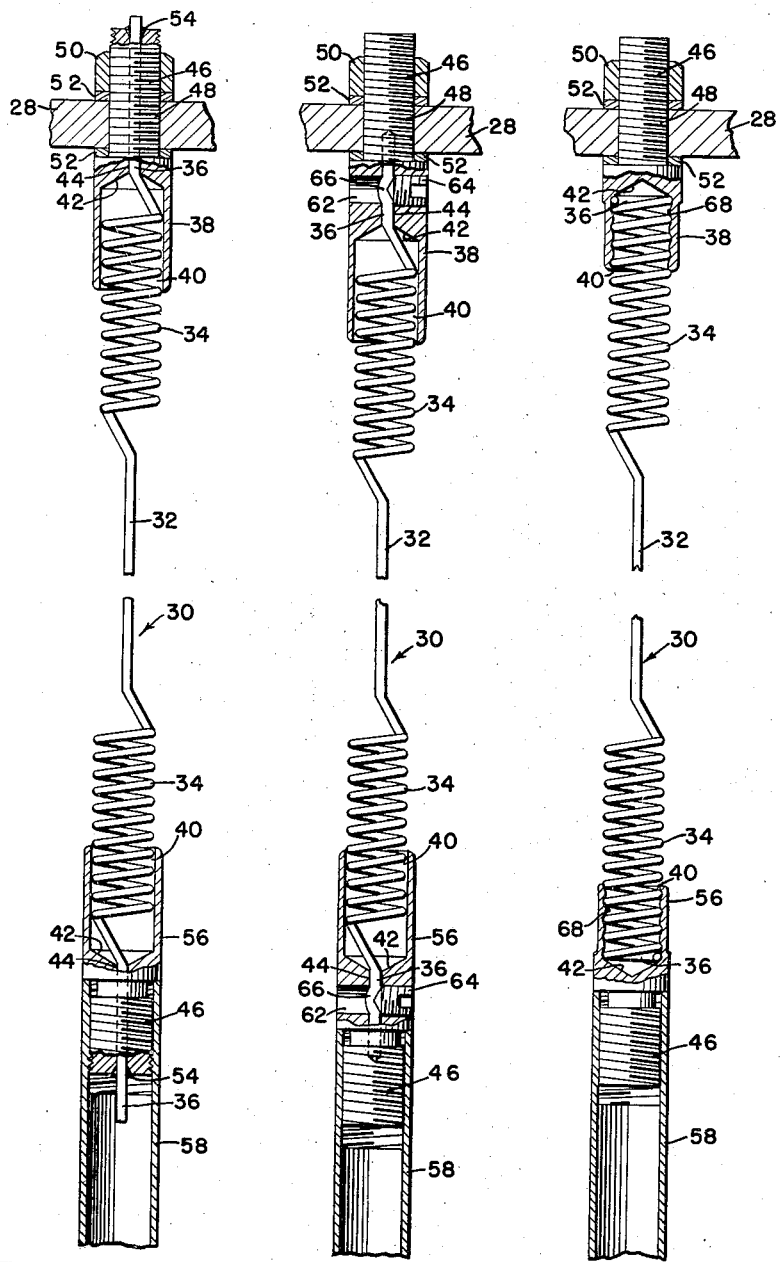
INVENTOR
JOHN A. ARMSTRONG
BY Harold T. Stowell
ATTORNEY

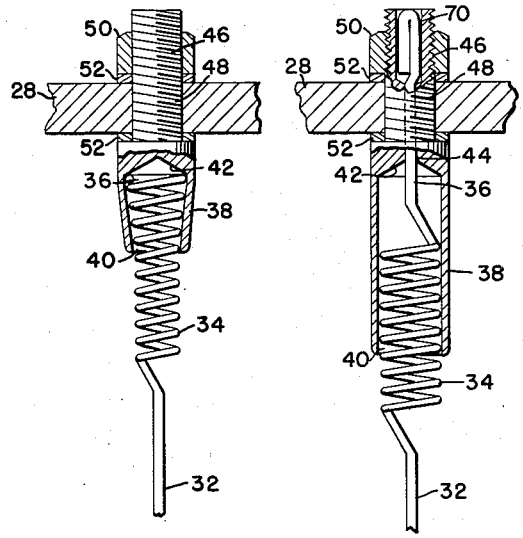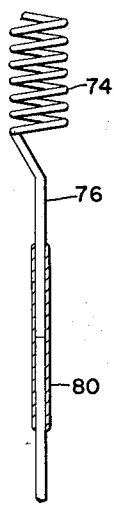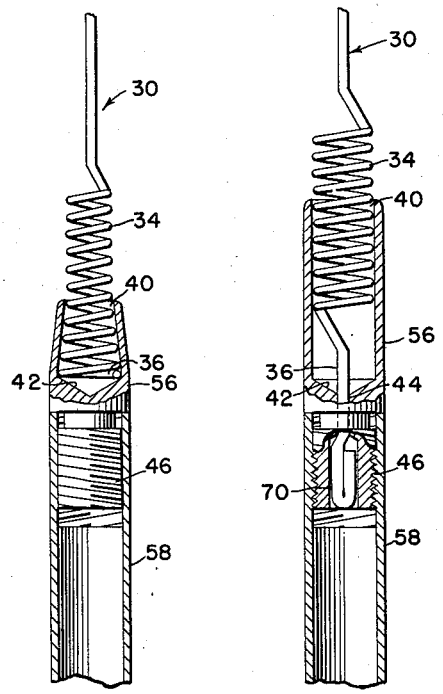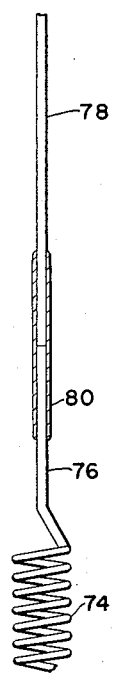
Fig. 5.   Fig. 6.   Fig. 7.
INVENTOR
JOHN A. ARMSTRONG
BY Harold T. Stowell
ATTORNEY United States Patent Office 2,867,287
Patented Jan. 6, 1959

2,867,287

DISCHARGE ELECTRODE

John A. Armstrong, Plainfield, N. J., assignor to Research Corporation, New York, N. Y., a corporation of New York Application June 4, 1956, Serial No. 589,065

5 Claims. (Cl. 183—7)

The present invention relates to new and useful improvements in wire electrodes for electrical precipitation apparatus and more particularly and specifically to new and improved flexible end mountings for such electrode wires.

It has been discovered in conventional electrode wire structures utilized in electrical precipitation apparatus that there is a high rate of breakage or fracture of electrode wires adjacent to their points of anchorage within the precipitator. It has also been determined that such breakage of electrode wires is usually attributable to excessive fatigue occurring in those areas adjacent the wire anchorage by repeated flexing of the wire induced by vibration resulting from the conventional rapping of the discharge electrode assembly for the purpose of dislodging deposited materials therefrom and due to oscillation of the electrodes promoted by electrical forces which varies directly with the power applied to the electrodes.

Attempts have been made to reduce the breakage factor in electrode wires by increasing the thickness of the wires in those areas adjacent their anchorage within the precipitator. However, such increased thicknesses have only served to transfer the fatigue areas longitudinally away from the points of anchorgae while at the same time creating additional problems resulting from increased weight and bulk of the wires and increased areas which reduce the desirable corona characteristics of the wire. Also increasing the thickness of the wire electrodes only serves to decrease the flexibility and hence increases the stress fatigue on the outside fibres.

It is, therefore, a principal object of the present invention to provide new and improved electrode wire construction which serves to eliminate the heretofore high breakage factor, and which, at the same time, avoids the ancillary problems which have been produced by prior attempts to accomplish the same advantageous purpose.

It is another object of this invention to provide electrode wires for electrical precipitation apparatus which include resilient and flexible anchorage means for the wires for increased resistance to fatigue in the high stress areas of the wire at those points where breakage has heretofore been prominent.

A further object of this invention is the provision of an electrode wire which provides a fatigue resistant construction serving greatly to reduce if not eliminate wire breakage.

Still a further object is the provision of flexible anchorage means for electrode wires which permits the utilization of wire of a minimum diameter while maintaining a maximum fatigue resistant construction thereby achieving increased corona characteristics in electrode wire structure.

Still another object of this invention is the provision of a flexible electrode wire anchoring means which enables the maintenance of a minimum of weight and bulk in the discharge electrode assembly and which at the same time, by permitting the use of a minimum diameter wire, enables the accomplishment of increased rapping efficiency of the wire.

Yet another object of this invention resides in the provision of a new and improved electrode wire construction for electrostatic precipitation apparatus which includes a flexible anchorage means for such wires which is of simple and inexpensive design and manufacture and which permits ready and easy installation and removal of electrode wires from the discharge assembly of the precipitation apparatus.

Still further objects and advantages of the present invention will become more readily evident to those skilled in the art when the following description and general statement are read in the light of the accompanying drawings.

The nature of the present invention may be stated in general terms as relating to an electrode wire construction for utilization in electrical precipitation apparatus which includes an elongated conductive wire, coil spring construction formed on the extremities of said wire, tubular shrouds telescopically receiving the extended ends of said spring structures, means securing said spring structures in said shrouds, one of said shrouds having quick detachable connection with the upper supporting member for said wire, and said lower shroud having a weighted member removably secured thereto.

Referring now to the accompanying drawings in which like numerals designate similar parts throughout the several views:

Fig. 2 is a fragmentary vertical section through an electrode wire structure disclosing the present invention;

Fig. 3 is a view similar to Fig. 2 illustrating a modified form of the electrode wire construction;

Fig. 4 is a view similar to Fig. 2 illustrating a second modified form of the invention;

Fig. 5 is a view similar to Fig. 2 illustrating another modified form of the invention;

Fig. 6 is a view similar to Fig. 2 illustrating still another modified form of the invention; and Fig. 7 is an elevational view of a modified form of the electrode wire constituting the present invention.

Figure 1:
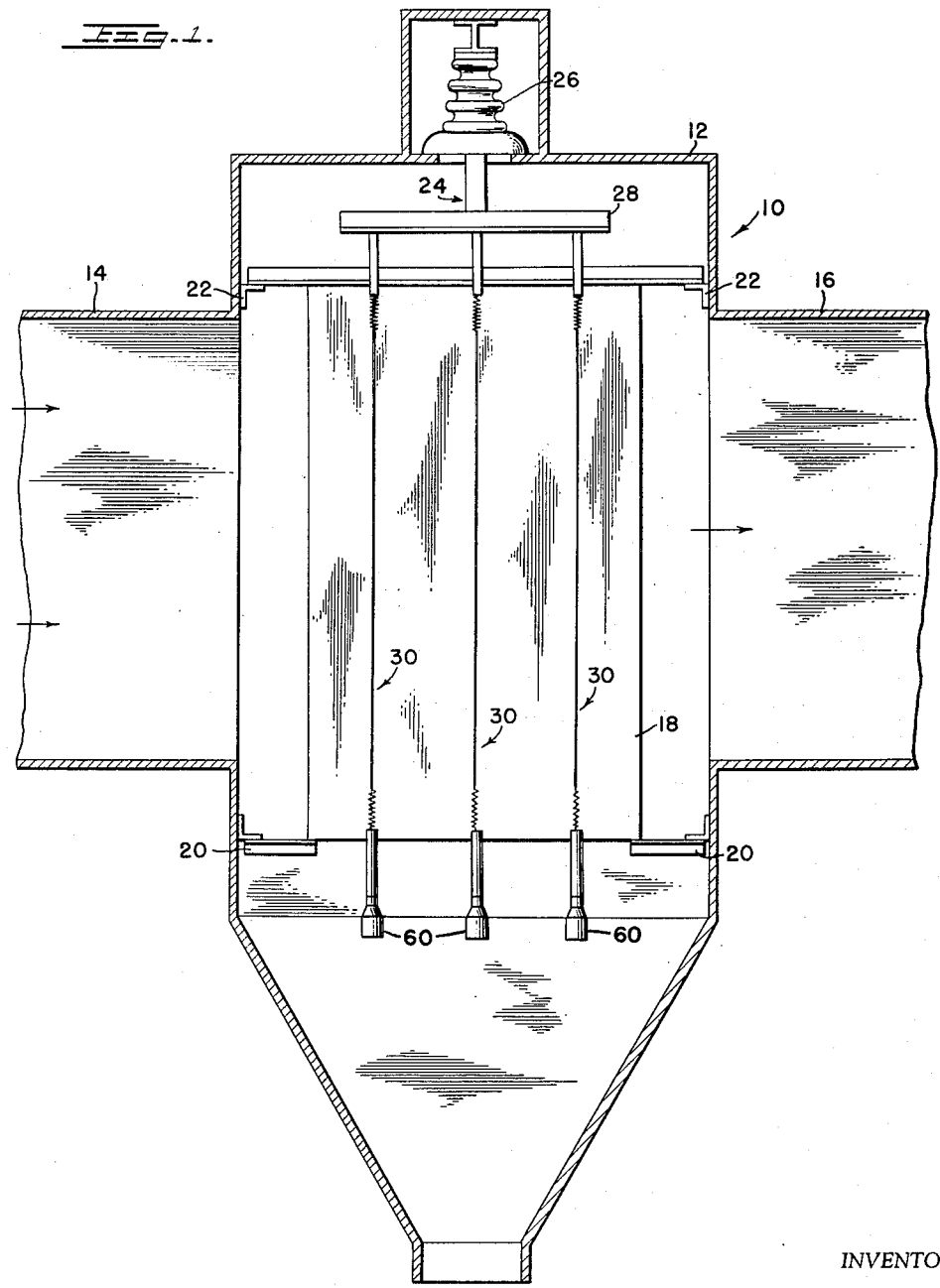
Fig. 1 is a vertical section through a typical precipitator disclosing the discharge electrode assembly therein.

Referring now to Fig. 1 of the drawings, there is shown a typical electrical precipitator, generally designated at 10, which includes a shell 12 having a gas inlet 14 on one side thereof and a gas outlet 16 on the second side opposite said inlet. Within the shell 12 there is mounted a series of collecting plates 18 which are located in parallel spaced relation in alignment between the inlet and the outlet of the shell. The plates are supported from the inner walls of the shell by bracket structures 20 and 22.

Associated in conventional arrangement with the collecting plate electrodes 18 of the precipitator apparatus is a discharge electrode assembly which includes a high tension frame 24 supported from an insulator assembly 26 on the upper wall of the shell. The high tension frame includes a plurality of frame bars 28, each of which extends in parallel spaced relationship between the upper ends of adjacent collecting electrode plates 18. The bars 28 of the high tension frame in turn support in longitudinally spaced relationship a plurality of discharge electrode wires 30 which depend between adjacent pairs of collecting electrode plates 18 to establish the electrostatic field through which gases entering the shell pass.

With particular reference to Fig. 2 of the drawings, it is seen that each of the discharge electrode wires 30 include an elongated wire section 32, each end of which is integrally formed into a spiral or coil spring section 34. Each extreme end of the wire is provided with a short extension 36 which extends outwardly from the spring section in axial alignment with the main central section 32.

At the upper end of the electrode wire there is provided a shroud member 38 which includes a tubular member open as at 40 at one end and provided intermediate its length with an annular shoulder 42 defining a small circular passage 44 extending through the second end of the tubular member. A portion of that end of the tubular member opposite the open end 40 is formed as a threaded stem 46 which, when assembling the wire within a precipitator, is inserted vertically through an opening 48 in one of the frame bars 28 and threadedly receives a nut 50, to securely anchor the tubular shroud to the frame bar. In attaching the tubular member to the frame bar locking washers 52 are provided about the threaded stem 48 above and below the bar as illustrated.

In assembling the tubular shroud member with the electrode wire, the coil spring section 34 at one end of the wire is telescopically inserted for a spaced distance within the open end 40 of the shroud member to position the extension 36 of the wire axially through the restricted passage 44 of the second end of the shroud member with the extreme end thereof projecting for a short distance beyond the threaded shank end of the shroud wherein it is secured by welding or the like as at 54. Thus the wire is securely anchored with a portion of the spring section thereof located within the tubular portion of the shroud.

A second tubular shroud member 56, identical to member 38, is secured to the second end of the electrode wire in the same manner as that in which member 38 is secured to the first end of the wire thereby presenting a threaded stem 46 depending below the extreme bottom end of the electrode wire which stem threadedly receives an internally threaded tubular extension 58 of a weight 60.

From the foregoing description it is seen that an electrode wire for an electrical precipitator is provided which has substantial flexibility in those areas immediately adjacent its point of anchorage to the high tension frame of the precipitator apparatus and its point of attachment to the conventional bottom weight member or frame. It is evident that the points of greatest fatigue and stress within an electrode wire constructed and mounted in accordance with the foregoing disclosure would be immediately adjacent the open ends of the anchoring shroud members 38 and 56. The provision of the coil spring sections on the electrode wire which are located partly within and partly outside of the open ends of the shroud members provide maximum flexibility and resistance to fatigue at these points.

Accordingly, an electrode wire constructed and mounted in accordance with this invention inherently achieves a maximum of resistance to breakage and at the same time achieves enhanced factors of flexibility when the high tension frame supporting the wires is subjected to rapping vibration in the conventional manner.

Referring to Fig. 3 of the drawings there is disclosed a modified form of the invention wherein the tubular shrouds 38 and 56 are each provided with a transverse axial passage 62 extending therethrough at a point intermediate the annular shoulder 42 and the inner end of the threaded shank 48 which passages threadedly receive set screws 64 at the inner ends of which contact the extension 36 of the wire where it projects through the restricted passage 44 in the shroud. The extension 36 may be crimped with a punch as at 66, after insertion, in the region of the passage 62 for forming an interlocking arrangement with the inner end of the set screw 64.

In Fig. 4 of the drawings is shown another construction of the electrode wire wherein the coil spring sections 34 of the wire are formed at the extreme end of the wire and terminate in a flush end coil portion 36 and wherein the tubular shroud members 38 and 56 are provided within the tubular portions thereof with a convolute thread 68 which threadedly receives the end portion of the coil spring section 34 therein. By this construction the spring sections are threadedly secured within the tubular shrouds and the necessity of securing an extension section as in the previous disclosed embodiments is eliminated. It is also evident that the shroud members 38 and 56 may be provided with the convoluted thread at the time the coil springs are assembled in the members 38 and 56 by inserting a solid plug of metal within the coil spring and swaging the parts together.

The embodiment disclosed in Fig. 5 of the drawings includes a modification of the shroud members 38 and 56 wherein the open ended tubular portions of the shroud are tapered during assembly in such a manner as to provide a reduced or restricted diameter adjacent the open end 40 as compared with a larger diameter portion adjacent the annular shoulder 42. The coil spring sections 34 on each end of the central wire section 32 are formed of a conical tapering spring section wherein the diameter of the coil segments increases toward the extended end of the spring section. The helical spring is inserted through the opening in the shroud and the end of the shroud is then swaged to a conical shape around the cone-shaped spring to interlock the spring and the shroud as illustrated.

In Fig. 6 of the drawings there is shown a modification of the shroud members 38 and 56 of the embodiment disclosed in Fig. 2 of the drawings wherein the restricted passage 44 extending through the threaded stem portion 48 of each shroud is provided with a section 70 of increased diameter extending inwardly from the outer extended end of the stem for a spaced distance inwardly of the stem. The wire extensions 36 beyond each of the spring sections 34 of the electrode are swaged into the section 70 of increased diameter to lock the extension against displacement axially through the shroud.

In all of the embodiments heretofore disclosed the spring sections 34 are formed as an integral part of the central section of the discharge wire and are locked into the anchoring shroud means to form a substantially composite unit. However, it is contemplated that the central section of the discharge wire and the coil spring sections could be formed as separate units.

In Fig. 7 of the drawings there is shown one embodiment of the invention illustrating a multi-part construction wherein coil spring sections 74 having axially projecting extensions 76 are disposed one at each end of a straight section 78 of a discharge electrode wire with the extensions 76 positioned in axial alignment and end to end abutment with the remote ends of the main wire section. When so positioned tubular splicing sleeves 80 are secured about the butted joints between the wire and the spring sections to overlap adjacent portions of each and said sleeves may be soldered or fused in place or crimped mechanically to interlock the spring sections and the central portion 78 of the wire. This construction provides a unitary wire which is capable of being anchored within the precipitator by any of the several illustrative embodiments heretofore disclosed. This form of the invention has the decided advantage that it is possible to use numerous combinations of spring sizes and materials with a particular electrode size and material.

While several forms of the invention have been shown for purposes of illustration, it is fully contemplated that various modifications may be incorporated in electrode wire constructions for the purpose of achieving the improved qualities and functions inherent in these structures and constituting the result of the inventive concept hereinbefore disclosed. For example, the lower support element 56 may be secured to a lower electrode frame member in the manner described with reference to the upper support elements 38 in installations where electrode weights are not desired.

I claim:

1. In a discharge electrode construction for an electrical precipitator having an electrode supporting frame, the combination comprising an elongate wire, helical sections formed integrally with each end of said wire, rigid tubular shroud members for receiving and snuggly engaging at least portions of said helical sections and for retaining the terminal portions of said sections, and means for connecting at least one of said shroud members to the electrode supporting frame.

2. A discharge electrode construction as defined in claim 1 wherein at least one of said helical sections is provided with an end portion extending axially through said shroud, and set screw means in said shroud engageable with said extending end portion of said spring section.

3. A discharge electrode construction as defined in claim 1 wherein at least one of said helical sections is of conical configuration having its greatest diameter at its extreme end and wherein the end of the tubular shroud is swaged to a conical shape around said spring to interlock the spring and the shroud.

4. A discharge electrode construction as defined in claim 1 wherein at least one of said helical sections is provided with an extreme end portion extending axially through said shroud, and said end portion is swaged upon itself to lock the same against axial displacement relative to said shroud.

5. In a discharge electrode construction for an electrical precipitator having an electrode supporting frame, the combination comprising, an elongated wire, helical spring sections positioned adjacent the remote ends of said wire, tubular sleeves positioned about and secured to the adjacent ends of said wire and spring sections forming a composite electrode wire unit having spring sections on the extreme ends thereof; rigid tubular shroud members each telescopically receiving and positively retaining the end portion of one of said coil spring sections, and one of said shroud members having connection to the electrode supporting frame.

References Cited in the file of this patent

UNITED STATES PATENTS 2,588,111     Hanneman  ------------ Mar. 4, 1952

UNITED STATES PATENT OFFICE

CERTIFICATE OF CORRECTION

Patent No. 2,867,287            January 6, 1959

John A. Armstrong

It is hereby certified that error appears in the printed specification of the above numbered patent requiring correction and that the said Letters Patent should read as corrected below.

Column 5, line 17, for "spring" read -- helical --; lines 22 and 23, for "spring", in each occurrence, insert -- helical section --.

Signed and sealed this 5th day of May 1959.

(SEAL)
Attest:

KARL H. AXLINE
Attesting Officer

ROBERT C. WATSON
Commissioner of Patents